P. C. SCHAANNING.
ROTATING ROLLERS FOR PRESSING OUT WATER FROM MOIST WOOD PULP, CELLULOSE, AND SIMILAR MATERIALS IN ENDLESS WEBS OR IN SHEETS.
APPLICATION FILED OCT. 18, 1913.
1,123,388.
Patented Jan. 5, 1915.
2 SHEETS—SHEET 1.
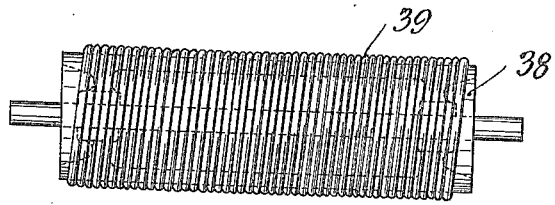
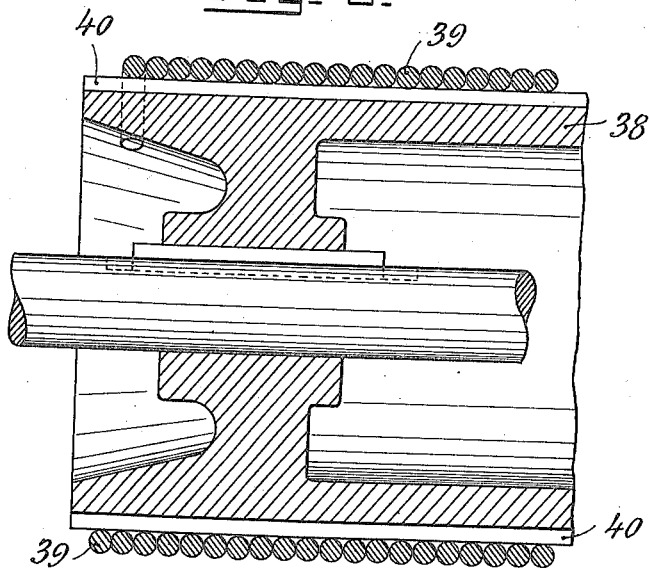
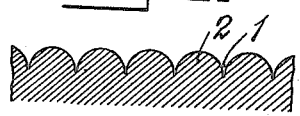
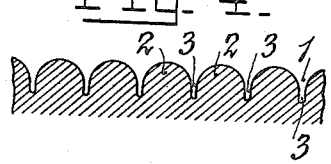
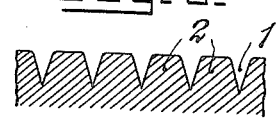
Witnesses:
John C. Sanders
Albert F. Neuman
Inventor:
P. C. Schaanning
by M. Wallace White
Attorney P. C. SCHAANNING.
ROTATING ROLLERS FOR PRESSING OUT WATER FROM MOIST WOOD PULP, CELLULOSE, AND SIMILAR MATERIALS IN ENDLESS WEBS OR IN SHEETS.
APPLICATION FILED OCT. 18, 1913.
1,123,388. Patented Jan. 5, 1915.
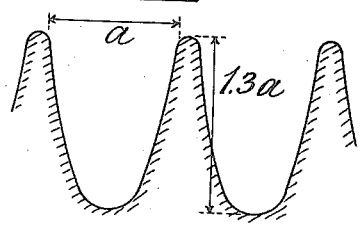
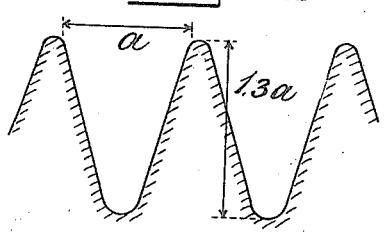
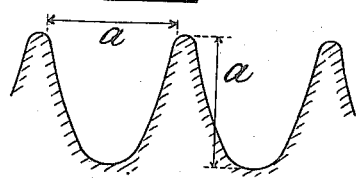
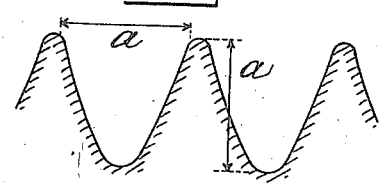
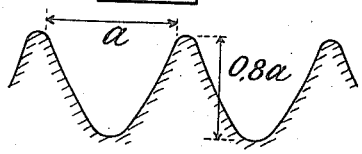
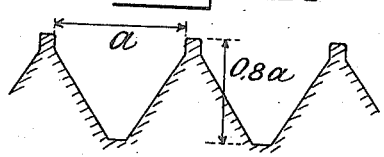
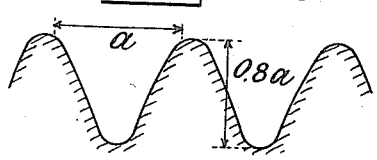
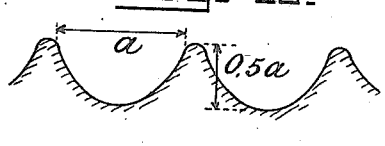
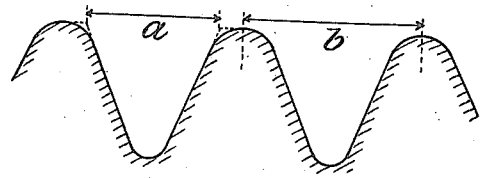
Witnesses:
John C. Sanders
Albert F. Newman
Inventor:
P. C. Schaanning
by Thr. Wallace White
Attorney

UNITED STATES PATENT OFFICE.

PEDER CHRISTIAN SCHAANNING, OF BAKKELAGET, NORWAY.

ROTATING ROLLERS FOR PRESSING OUT WATER FROM MOIST WOOD-PULP, CELLULOSE, AND SIMILAR MATERIALS IN ENDLESS WEBS OR IN SHEETS.

1,123,388.

Specification of Letters Patent. Patented Jan. 5, 1915.

Application filed October 18, 1913. Serial No. 795,827.

*To all whom it may concern:*

Be it known that I, PEDER CHRISTIAN SCHAANNING, engineer, subject of Norway, residing at Bakkelaget, near Christiania, Norway, have invented new and useful Improvements in Rotating Rollers for Pressing Out Water from Moist Wood-Pulp, Cellulose, and Similar Materials in Endless Webs or in Sheets, of which the following is a specification.

In the manufacture of wood pulp and paper various constructions of rollers are used for pressing out water from moist wood pulp or cellulose webs or sheets. The construction of said rollers is of fundamental importance for the pressing device. The pressing rollers hitherto known are complicated being as a rule combined with a felt coating or artificial suction. The felt coating will also, especially where high pressure is used, last but a very short time, and is also unreliable in its operation. Furthermore the surface of the rollers have been provided with channels, grooves, depressions, holes, or a metal coating for the purpose of providing channels for conducting away the water that has been pressed out of the material.

The present invention is based on the observation that the capillary action is of the greatest importance in pressing out the water. Practical experiments have proved that when the circumferential channels that pass transversely of the roller or approximately so, are made with a cross-section highly narrowed inwardly, a sort of automatic suction is produced, owing to the capillary action, so that surprisingly good results are obtained even without the use of longitudinal channels in the roller surface. The possibility of conducting the water to the end of the roller is of minor importance. It has been found, on the other hand, that a roller in which the capillary channels pass in the longitudinal direction, are more or less inefficient, which is surprising and difficult to explain. The applicant has further by comparative experiments made the experience that a roller with a wire wound on it may replace the felt coating in all cases where it is of no consequence whether marks are made in the web or not. A roller, that is made entirely of metal, is of unlimited durability, especially when the wire is galvanized or made of a rust-proof metal, and is an important technical improvement on rollers having a felt coating.

Several embodiments of the invention are illustrated in the accompanying drawings, in which:

Figure 1 is a side view of a pressing roller, and Fig. 2 a portion of a longitudinal section through the same on a larger scale. Figs. 3-14 show parts of longitudinal sections through rollers of a somewhat modified construction.

Referring first to Figs. 1 and 2 of the drawings the pressing roller consists of the roller proper —38—, which has a smooth surface and a wire —39— of metal or other suitable material wound on it so that the entire circumference of the roller is covered by a uniformly wound layer of this material. The cross-sectional area of the material is suitably round or polygonal. In this manner a helical air space will be formed around the roller between the same and that side of the winding material which faces the roller. During the pressing operation the water that has been pressed out will penetrate downwardly into the joints of the winding and will be free to flow away to a point of the roller where there is no obstacle and whence it may again be discharged. The surface of this roller will also, as mentioned above, exert a strong sucking action, the adhesion between water and iron as well as the capillary action in particular causing the water, that has been pressed out, to find its way into the channel in the circumference of the roller so that, once pressed out, it will not again be sucked up by the dry web or sheet after the latter has passed the point of pressure. The surface of the roller may also be provided in a well known manner with a number of longitudinal or helical narrow channels, as indicated at —40— in Fig. 2, although such channels are of minor importance. Said channels will take up the water, that has been pressed out and conduct it to one or both ends of the roller. In the case of said channels being choked up the same may be poked open and washed clean again. Of course the same effect will be produced, if the wire windings are replaced by a number of metal rings covering the entire circumference of the roller and tightly engaging the same, but the spirally wound wire, which is considerably easier to make, is preferred.

As shown in Figs. 3, 4 and 5 the narrowed channels or grooves —1— may also be made integral with or turned or worked down into the roller material itself in such a manner, that their cross-sectional area has nearly the same shape as that of grooves formed by means of a wire covering. Fig. 3 of the drawing illustrates the most simple construction which corresponds to a roller having a tight fitting winding or circular wires. According to Fig. 4 the capillary action and also the capacity of the grooves are somewhat increased, because the several ribs —2—, forming the grooves —1— between them, are slightly separated from each other, so that very narrow sucking clefts or rifts —3— form the bottom part of the grooves. Fig. 5 shows a further construction, which corresponds nearly to a roller provided with a winding of wire having hexagonal cross-section. In all these examples there may be proved to exist a certain degree of capillary action upon the water pressed out from the web passing between the rollers. However, I have found that usable results can be obtained without a real capillary action taking place, but in such case there must exist a certain relation between the width, depth and mutual distance of the channels. This relation must be so, that on the one hand the ribs of the web pressed into the channels do not fill out the latter completely, whereas on the other hand these ribs during their pressing into the channels must undergo a certain compression crosswise, in order that the web material may leave the pressing rollers with a suitable degree of dryness. Finally the free space existing between the ribs of the material and the bottom of the channels must not have too large cross-sectional area in relation to the whole cross-sectional area of the channels, for else the rib tops of the web pass out from the press rollers in a highly moist condition, because they after their passage through the pressing place suck back a part of the water which has been already pressed out and which is still being between the roller ribs.

By experiments with rollers having channels of different cross-sectional shapes it has been found that channels with a larger width than 3 millimeters and a less width than 1 millimeter do not yield good results. As to the depth it is further found, that it should not be larger than 0.3 of the maximal width. Between these limits, however, the cross-sectional shape of the channels may be varied. This is probably due to the fact, that within the said dimensioning limits the adhesion between the water and the roller metal in the bottom of the channels will always be sufficiently high to exert an action which can be equal, to a certain degree, to the capillary action referred to hereinbefore, and at the same time the conditions above mentioned are fulfilled.

Figs. 6–14 illustrate in an enlarged scale a number of channel cross-sections which have been found to yield satisfactory result. The shallower the channels the quicker must their sides converge downwardly. In the channel of the least depth shown (viz: equal to one half of the width) semi-circular cross-section is unsuitable, because by the latter a sufficient dry-pressing of the top parts of the material-ribs cannot be obtained. The cross-section must lie inside the semi-circle as shown in Fig. 13.

In Figs. 6–14 —$a$— is the width of the channels. In Fig. 14, in which the rib tops are much rounded, this width is to be considered as the distance between the intersections between the outer roller-periphery and the inclined sides of the channels. The distance —$a$— thus will be less than the pitch —$b$—.

Figs. 6–14 show, as said, the channels in an enlarged scale. When they are imagined to be made of natural size, viz: with a width not larger than 3 millimeters, it may be understood that—even by the channel shapes in which the bottom is much rounded (for instance Figs. 6, 8, 13)—a high adhesion-action takes place, which may be compared with the capillary action, although such a one, in the real meaning of this expression, can not be said to take place.

It is clear that it is most advantageous to arrange the channels in the cross direction of the rollers. But also channels of other direction can be used. Experience shows, however, that the results of the pressing is the more depreciated, the more the direction of the channels is axial. Quite axial channels can not be used, because the out-pressed water cannot in such case flow away quickly enough and the web is therefore squeezed to pieces.

Having now described my invention, what I claim as new and desire to secure by Letters Patent is:

1. In pressing-rollers for pressing moist woodpulp or cellulose stock in the shape of sheets or endless webs, the arrangement of metallic circumferential channels or grooves passing transversely of the roller, or approximately so, and having a cross-section narrowing radially inward to such a degree that they will exert a capillary action on the water driven out at the point of pressure.

2. In pressing-rollers for pressing moist woodpulp or cellulose stock in the shape of sheets or endless webs, the arrangement of a metal wire with a circular or polygonal cross-section spirally wound on the roller in tight engagement with the same, whereby the wire will form a metallic surface with circumferential channels or grooves between the several windings, the said channels or grooves passing approximately transversely of the roller and exerting a capillary action on the water driven out at the point of pressure.

3. In pressing-rollers for pressing moist woodpulp or cellulose stock in the shape of sheets or endless webs, the arrangement of metallic circumferential channels or grooves passing transversely of the roller, or approximately so, and having a width less than 3 millimeters and larger than 1 millimeter, their depth being larger than 0.3 of the said width and the grooves or channels being formed integral with the roller material itself.

In testimony whereof I have signed my name to this specification in the presence of two subscribing witnesses.

PEDER CHRISTIAN SCHAANNING.

Witnesses:
OKER LAHN,
MOGENS BUGGE.